(12) United States Patent
Farley

(10) Patent No.: US 11,554,333 B2
(45) Date of Patent: Jan. 17, 2023

(54) METHOD OF FILTERING WATER BEING RETURNED TO A SWIMMING POOL

(71) Applicant: Jason Farley, Windham, ME (US)

(72) Inventor: Jason Farley, Windham, ME (US)

(*) Notice: Subject to any disclaimer, the term of this patent is extended or adjusted under 35 U.S.C. 154(b) by 36 days.

(21) Appl. No.: 17/357,033

(22) Filed: Jun. 24, 2021

(65) Prior Publication Data
US 2021/0402331 A1 Dec. 30, 2021

Related U.S. Application Data

(60) Provisional application No. 63/043,208, filed on Jun. 24, 2020.

(51) Int. Cl.
| | | |
|---|---|---|
| *B01D 24/10* | (2006.01) |
| *B01D 39/04* | (2006.01) |
| *C02F 1/00* | (2006.01) |
| *C02F 103/42* | (2006.01) |

(52) U.S. Cl.
CPC ............ *B01D 24/10* (2013.01); *B01D 39/04* (2013.01); *C02F 1/001* (2013.01); *C02F 2103/42* (2013.01)

(58) Field of Classification Search
None
See application file for complete search history.

(56) References Cited

U.S. PATENT DOCUMENTS

| | | | | |
|---|---|---|---|---|
| 620,451 A * | 2/1899 | Helwig | ................... | C02F 1/003 210/287 |
| 1,658,830 A * | 2/1928 | Bingham | ............ | A61M 3/0279 239/315 |
| 2,985,307 A * | 5/1961 | Grasmere | .............. | B01D 29/15 210/167.13 |
| 2,989,185 A * | 6/1961 | Lombardi | ............. | E04H 4/1263 210/167.2 |
| 3,063,077 A * | 11/1962 | Pansini | ................. | E04H 4/1618 210/167.16 |
| 3,120,491 A * | 2/1964 | Kincaid | ................. | B01D 35/05 210/463 |
| 3,186,550 A * | 6/1965 | Beduhn | ................. | E04H 4/1636 210/473 |
| 3,261,371 A * | 7/1966 | Vernon | ................. | E04H 4/1681 285/260 |
| 3,372,809 A * | 3/1968 | Spitzer | .................. | E04H 4/1272 210/249 |
| 3,381,822 A * | 5/1968 | Martin | .................. | E04H 4/1209 210/407 |
| 3,419,151 A * | 12/1968 | Wrotnowski | .......... | B01D 29/27 210/489 |
| 3,464,561 A * | 9/1969 | Wrotnowski | .......... | B01D 29/27 210/232 |
| 3,487,944 A * | 1/1970 | Tucker | .................... | D06F 39/10 210/463 |
| 3,578,023 A * | 5/1971 | Diemond | .................. | E04H 4/12 4/492 |
| 3,638,799 A * | 2/1972 | Serowiecki | ............ | B01D 29/27 210/462 |
| 3,762,562 A * | 10/1973 | Okuniewski | .......... | F16L 37/084 210/460 |
| 3,804,258 A * | 4/1974 | Okuniewski | ........... | B01D 29/23 285/259 |

(Continued)

*Primary Examiner* — Robert J Popovics

(57) ABSTRACT

A liquid filtering device that works in conjunction with an existing filtration system to provide, for example, cleaner water in a swimming pool.

8 Claims, 12 Drawing Sheets

(56) References Cited

U.S. PATENT DOCUMENTS

| | | | | |
|---|---|---|---|---|
| 3,947,362 A * | 3/1976 | Etani | B01D 29/111 | 210/457 |
| 3,959,138 A * | 5/1976 | Nichols | B01D 29/232 | 210/94 |
| 3,960,733 A * | 6/1976 | Van Dieren | B01D 29/23 | 210/485 |
| 3,961,393 A * | 6/1976 | Pansini | E04H 4/1618 | 15/1.7 |
| 3,984,330 A * | 10/1976 | Nichols | B01D 29/232 | 210/460 |
| 4,058,463 A * | 11/1977 | Bartik | B01D 17/10 | 210/493.1 |
| 4,123,361 A * | 10/1978 | Marschman | D06F 39/10 | 210/232 |
| 4,303,519 A * | 12/1981 | DelVecchio | B01D 29/27 | 210/238 |
| 4,501,659 A * | 2/1985 | Henk | E04H 4/1272 | 417/90 |
| 4,520,514 A * | 6/1985 | Johnson | E04H 4/12 | 4/492 |
| 4,523,992 A * | 6/1985 | Sackett | B01D 29/25 | 210/232 |
| 4,545,905 A * | 10/1985 | Poe | B01D 24/4631 | 210/167.14 |
| 4,613,169 A * | 9/1986 | Engelhart | F16L 41/14 | 277/606 |
| 4,743,370 A * | 5/1988 | Mizusawa | B01D 35/0273 | 210/460 |
| 4,746,424 A * | 5/1988 | Drew | E04H 4/1263 | 210/167.2 |
| 4,818,389 A * | 4/1989 | Tobias | E04H 4/1272 | 417/186 |
| 4,826,591 A * | 5/1989 | Macia | E04H 4/1272 | 4/512 |
| 4,874,510 A * | 10/1989 | Akira | F02M 37/50 | 210/462 |
| 4,894,149 A * | 1/1990 | Block | B01D 24/004 | 210/260 |
| 4,906,367 A * | 3/1990 | Villagomez | B01D 29/27 | 68/18 F |
| 4,950,393 A * | 8/1990 | Goettl | E04H 4/1681 | 210/167.17 |
| 4,970,880 A * | 11/1990 | Luger | D06F 39/10 | 68/208 |
| 4,994,178 A * | 2/1991 | Brooks | E04H 4/16 | 405/74 |
| 5,040,250 A * | 8/1991 | Barnes | E04H 4/1209 | 138/104 |
| 5,089,108 A * | 2/1992 | Small | B01D 29/15 | 210/287 |
| 5,178,752 A * | 1/1993 | McKinnon | B01D 29/27 | 210/474 |
| 5,225,074 A * | 7/1993 | Moini | B01F 25/314 | 210/242.1 |
| 5,238,585 A * | 8/1993 | Reed, Sr. | E04H 4/1645 | 15/409 |
| 5,264,122 A * | 11/1993 | Lakotish | B01D 35/05 | 210/167.2 |
| 5,279,728 A * | 1/1994 | Weiss | B01D 35/05 | 210/167.2 |
| 5,350,508 A * | 9/1994 | Van der Watt | E04H 4/1263 | 210/167.2 |
| 5,454,940 A * | 10/1995 | Lakotish | B01D 35/05 | 210/167.2 |
| 5,466,373 A * | 11/1995 | Handwerker | C02F 3/06 | 210/150 |
| 5,505,844 A * | 4/1996 | Porter | B01D 24/4642 | 210/167.13 |
| 5,536,397 A * | 7/1996 | D'Offay | B01D 29/27 | 4/492 |
| 5,662,796 A * | 9/1997 | Kerecz | B01D 29/216 | 239/315 |
| 5,788,850 A * | 8/1998 | Tuomey | E04H 4/1263 | 210/167.2 |
| 5,792,368 A * | 8/1998 | Robertson | B01D 24/36 | 119/260 |
| 5,879,567 A * | 3/1999 | Robertson | C02F 3/085 | 119/260 |
| 5,881,401 A * | 3/1999 | Saputo | E04H 4/1681 | 239/394 |
| 5,919,359 A * | 7/1999 | Bisseker | E04H 4/1254 | 4/492 |
| 5,954,972 A * | 9/1999 | Polimeni, Jr. | E04H 4/1263 | 210/167.2 |
| 5,961,822 A * | 10/1999 | Polimeni, Jr. | E04H 4/1263 | 210/167.2 |
| 6,007,714 A * | 12/1999 | Keith | E04H 4/1272 | 210/474 |
| 6,009,573 A * | 1/2000 | Thibault | E04H 4/1218 | 4/496 |
| 6,022,481 A * | 2/2000 | Blake | E04H 4/1645 | 210/776 |
| 6,027,641 A * | 2/2000 | Spradbury | E04H 4/1263 | 210/167.2 |
| 6,041,453 A * | 3/2000 | Barrow | E04H 4/1263 | 210/167.2 |
| 6,051,132 A * | 4/2000 | Flores | A01K 63/045 | 210/232 |
| 6,063,270 A * | 5/2000 | d'Offay | E04H 4/1263 | 210/167.2 |
| 6,086,759 A * | 7/2000 | Bisseker | B01D 29/27 | 210/167.19 |
| 6,108,829 A * | 8/2000 | Wadsworth | A61H 33/601 | 4/584 |
| 6,143,187 A * | 11/2000 | Robertson | C02F 3/085 | 210/354 |
| 6,210,573 B1 * | 4/2001 | Marshall | B01D 29/27 | 210/462 |
| 6,241,877 B1 * | 6/2001 | Berkey | B01D 29/96 | 210/232 |
| 6,253,585 B1 * | 7/2001 | Wright | D06F 39/10 | 68/18 F |
| 6,334,953 B1 * | 1/2002 | Singleton | E03F 5/14 | 405/36 |
| 6,378,146 B1 * | 4/2002 | Johnston | A61H 33/0087 | 4/615 |
| 6,551,507 B2 * | 4/2003 | Gosling | B01D 29/33 | 210/232 |
| 6,805,792 B1 * | 10/2004 | Caraballo | B01D 35/157 | 210/259 |
| 6,830,680 B2 * | 12/2004 | Queirel | E04H 4/1272 | 137/602 |
| 6,857,819 B2 * | 2/2005 | Gunderson, III | B01D 17/0202 | 405/60 |
| 6,875,350 B2 * | 4/2005 | Allard | B01D 29/902 | 210/170.03 |
| 7,267,289 B2 * | 9/2007 | Lyons | D06F 39/10 | 239/524 |
| 7,296,308 B2 * | 11/2007 | Turner | A63B 69/125 | 239/394 |
| 7,300,576 B1 * | 11/2007 | Blake | E04H 4/1272 | 4/507 |
| 7,311,820 B1 * | 12/2007 | Anderson | E04H 4/169 | 4/490 |
| 7,311,821 B2 * | 12/2007 | Queirel | E04H 4/1272 | 210/232 |
| 7,318,448 B2 * | 1/2008 | Fleischer | E04H 4/1654 | 251/251 |
| 7,354,512 B1 * | 4/2008 | Barbe | B01D 29/27 | 210/232 |
| 7,452,460 B2 * | 11/2008 | Blake | E04H 4/1254 | 210/232 |
| 7,455,767 B2 * | 11/2008 | Pamperin | E04H 4/1272 | 210/167.2 |
| 7,507,332 B2 * | 3/2009 | Henkin | E04H 4/1654 | 210/167.17 |
| 7,575,675 B2 * | 8/2009 | Gopalan | B01D 29/23 | 210/232 |

(56) References Cited

U.S. PATENT DOCUMENTS

| | | | | |
|---|---|---|---|---|
| 7,677,268 B2* | 3/2010 | Griffin | F16K 11/20 | |
| | | | 137/885 | |
| 7,721,370 B2* | 5/2010 | Gopalan | F16L 3/1041 | |
| | | | 210/232 | |
| 7,753,090 B2* | 7/2010 | Earp | F16L 55/00 | |
| | | | 141/86 | |
| D630,295 S * | 1/2011 | Bechtold, Jr. | D23/209 | |
| 7,993,515 B2* | 8/2011 | Davies | E04H 4/1272 | |
| | | | 210/167.2 | |
| D686,376 S * | 7/2013 | Barnhill | D32/30 | |
| 8,968,559 B2* | 3/2015 | Gopalan | B01D 29/27 | |
| | | | 210/232 | |
| 8,974,665 B2* | 3/2015 | Vreeland | E03F 5/14 | |
| | | | 210/170.03 | |
| 9,539,529 B2* | 1/2017 | Mullis | B01D 35/02 | |
| 9,714,518 B2* | 7/2017 | Gopalan | E04H 4/1654 | |
| 9,745,766 B2* | 8/2017 | Gopalan | B01D 29/27 | |
| 10,385,578 B2* | 8/2019 | Elsawi | C02F 1/001 | |
| 10,537,492 B2* | 1/2020 | Lin | E04H 4/12 | |
| 10,857,066 B2* | 12/2020 | Lin | A61H 33/6063 | |
| 11,136,772 B2* | 10/2021 | Elsawi | E04H 4/1218 | |
| 11,236,522 B2* | 2/2022 | Marano | E04H 4/169 | |
| 11,311,825 B2* | 4/2022 | Hess | E04H 4/1209 | |
| 11,331,616 B2* | 5/2022 | Henderson | B01D 29/58 | |
| 2004/0232058 A1* | 11/2004 | Silverstein | B01D 29/27 | |
| | | | 210/167.17 | |
| 2005/0279682 A1* | 12/2005 | Davidson | F16K 11/20 | |
| | | | 210/167.17 | |
| 2006/0282943 A1* | 12/2006 | Vandecamp | E04H 4/12 | |
| | | | 4/507 | |
| 2006/0289344 A1* | 12/2006 | Queirel | E04H 4/1272 | |
| | | | 210/167.1 | |
| 2007/0045163 A1* | 3/2007 | Meincke | C02F 1/004 | |
| | | | 210/167.1 | |
| 2021/0402331 A1* | 12/2021 | Farley | B01D 24/10 | |
| 2022/0096988 A1* | 3/2022 | Henderson | B01D 29/21 | |
| 2022/0258091 A1* | 8/2022 | Henderson | C02F 1/001 | |

* cited by examiner

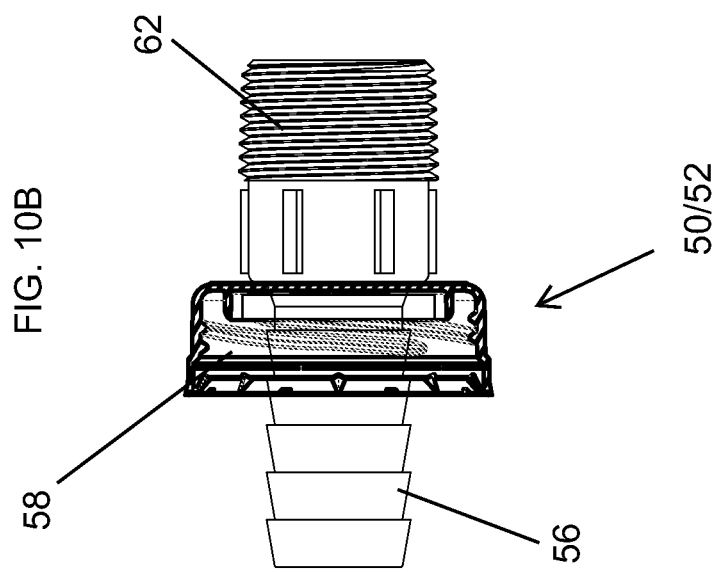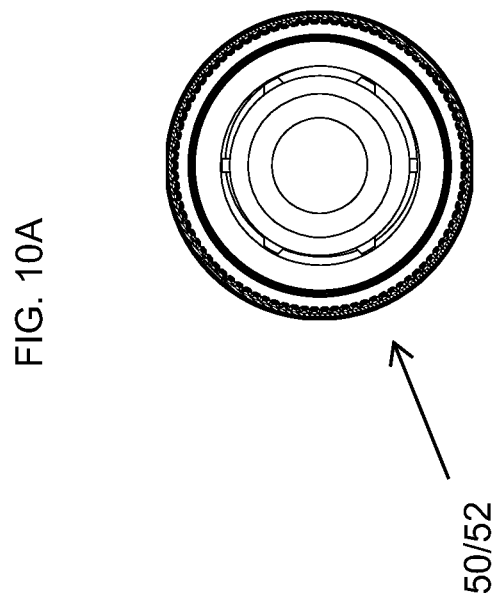

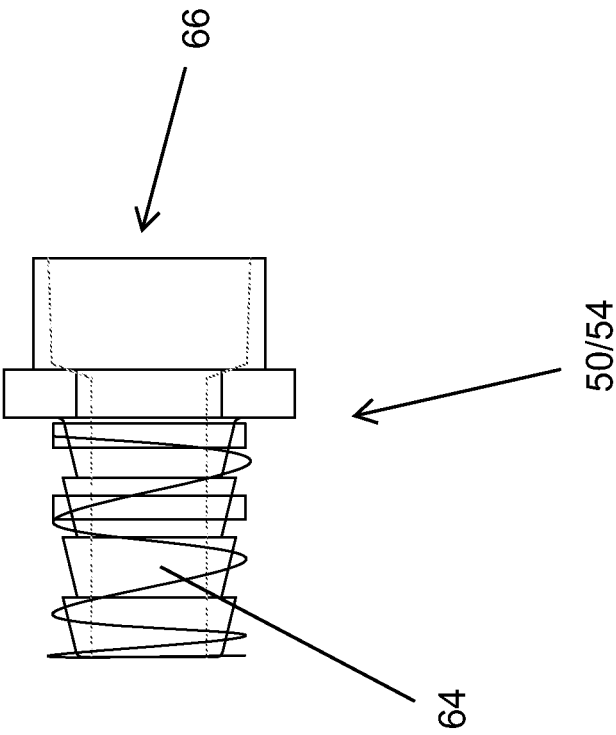
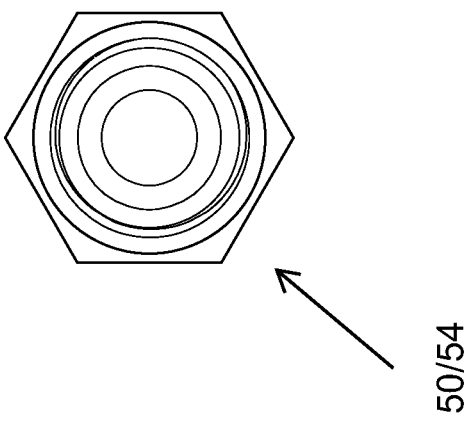
FIG. 11B
FIG. 11A

METHOD OF FILTERING WATER BEING RETURNED TO A SWIMMING POOL

BACKGROUND INFORMATION

Field of the Invention

The invention relates to filters and, in particular, pool filters.

Discussion of Prior Art

Any long-standing permanent or semi-permanent pool requires a filtration system to clean the water in the pool. Conventional filtration systems are typically external systems that connect to the pool via outlet valves and return feeds. In use the filtration system pumps water out of the pool through the outlet valve, through a filtering device, and returns the water to the pool under pressure through the return feed.

While these conventional systems preform reasonably well under normal operating conditions there are times when the conditions are such that these systems are not sufficient. For example, when pools are initially opened for the season after an extended period of time without filtration, or times when pollen is especially prevalent, or following stormy weather. Other times the mere nature of the pool and local water supply simply make it difficult for the conventional system to keep the pool clean.

What is needed, therefore, is an additional filter device that may be added to a conventional system when additional filtration is needed.

BRIEF SUMMARY OF THE INVENTION

The invention is a filtering device that typically connects to a conventional pool filtration system, likely connecting to the return feed of the conventional system, and provides an additional layer of filtration as the conventionally filtered water reenters the pool. The filter includes a container that attaches to the return feed, most likely on the inside of the pool. The container is filled with a filtration material, such as polyester fiberfill, and has multiple small openings located around the container. For example, the container may be largely cylindrical in shape with multiple openings along the sides of the container and at the end of the container.

As the conventionally filtered water passes through the return feed from the conventional filtration system it enters the filter, passes through the filtration material where it is filtered for a second time, and exits the filter through the openings in the container.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 10A is a top plan view of a second embodiment of the pool attachment member showing the filtering device side of the attachment member.

FIG. 10B is a side view of the second embodiment of the filtering device side of the pool attachment member.

FIG. 11A is a top plan view of the second embodiment of the pool attachment member showing the pool side of the pool attachment member.

FIG. 11B is a side view of the second embodiment of the pool side of the attachments member.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
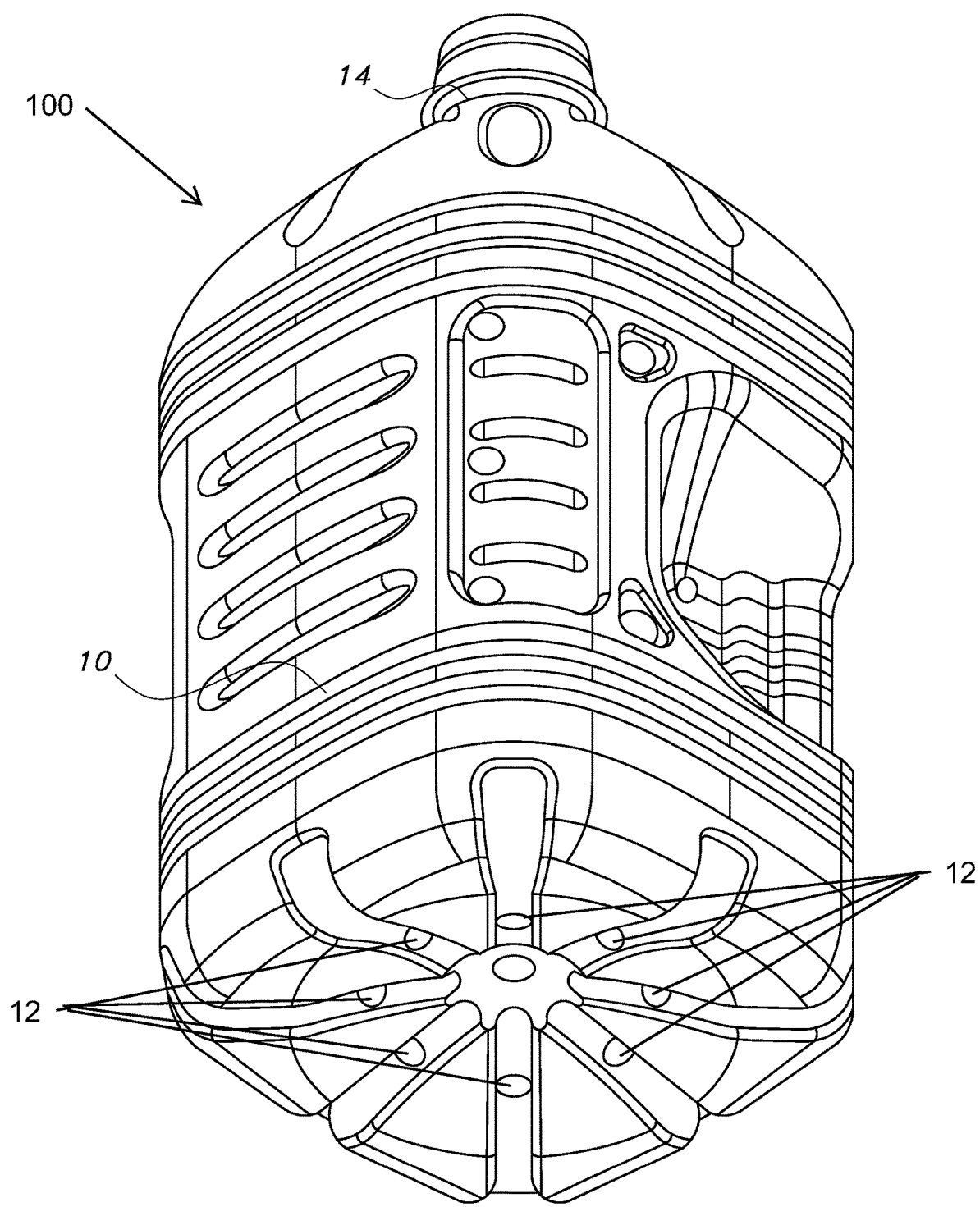
FIG. 1 is a perspective view of the filter according to the invention.
Figure 2:
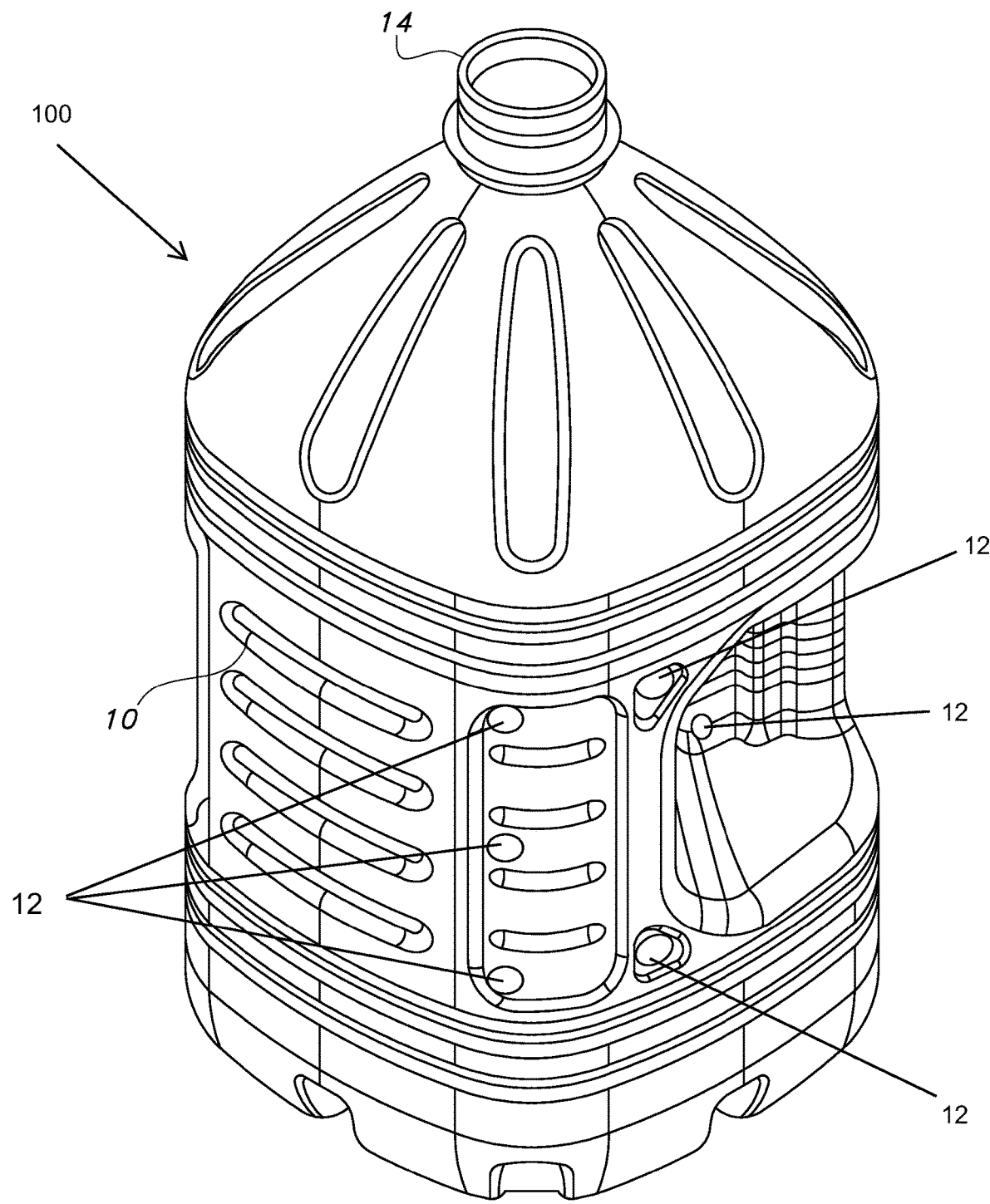
FIG. 2 is a perspective view of the filter.
Figure 3:
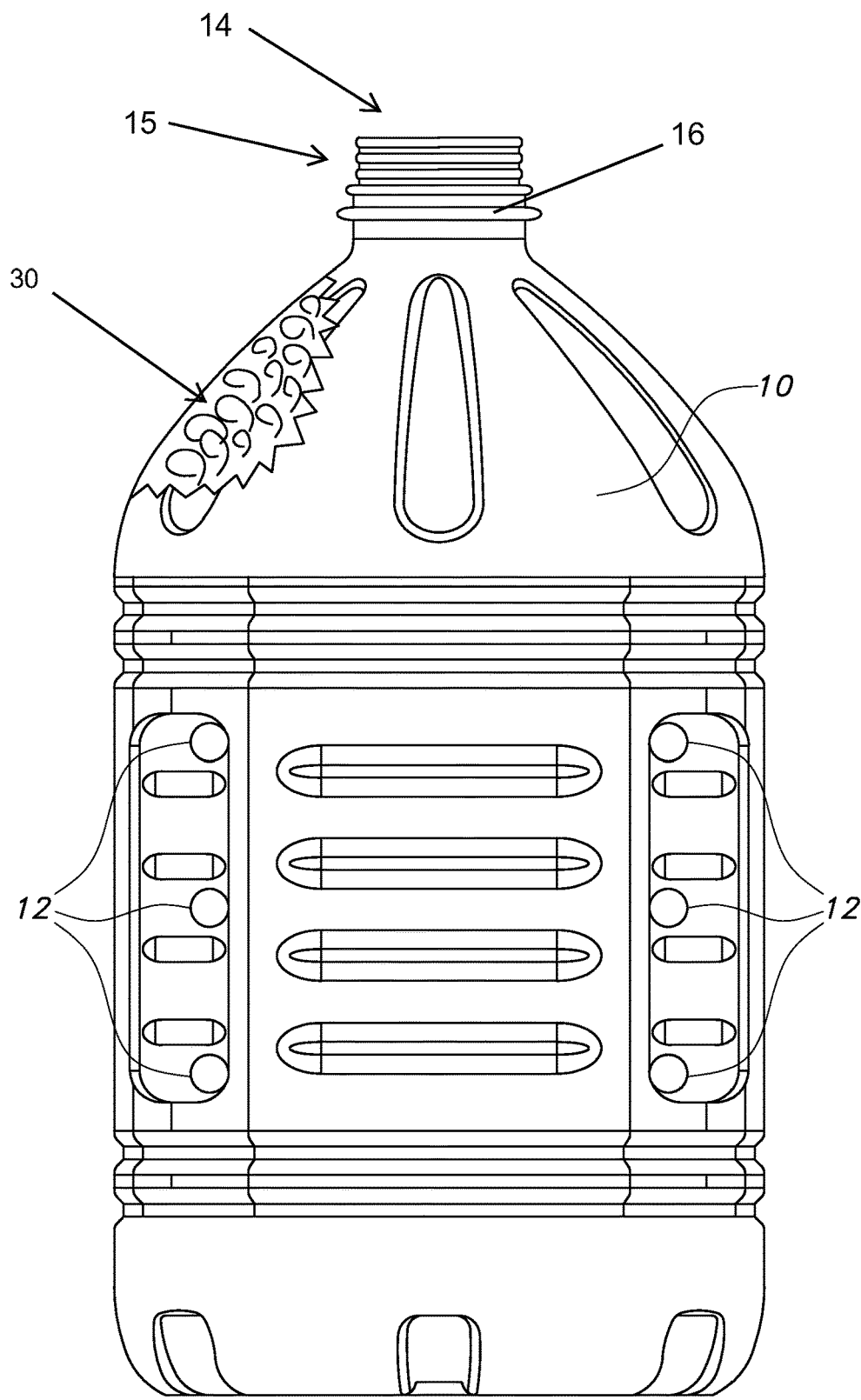
FIG. 3 is a front view of the filter with a cut away in the upper left corner to illustrate the filtering material inside the device.
Figure 4:
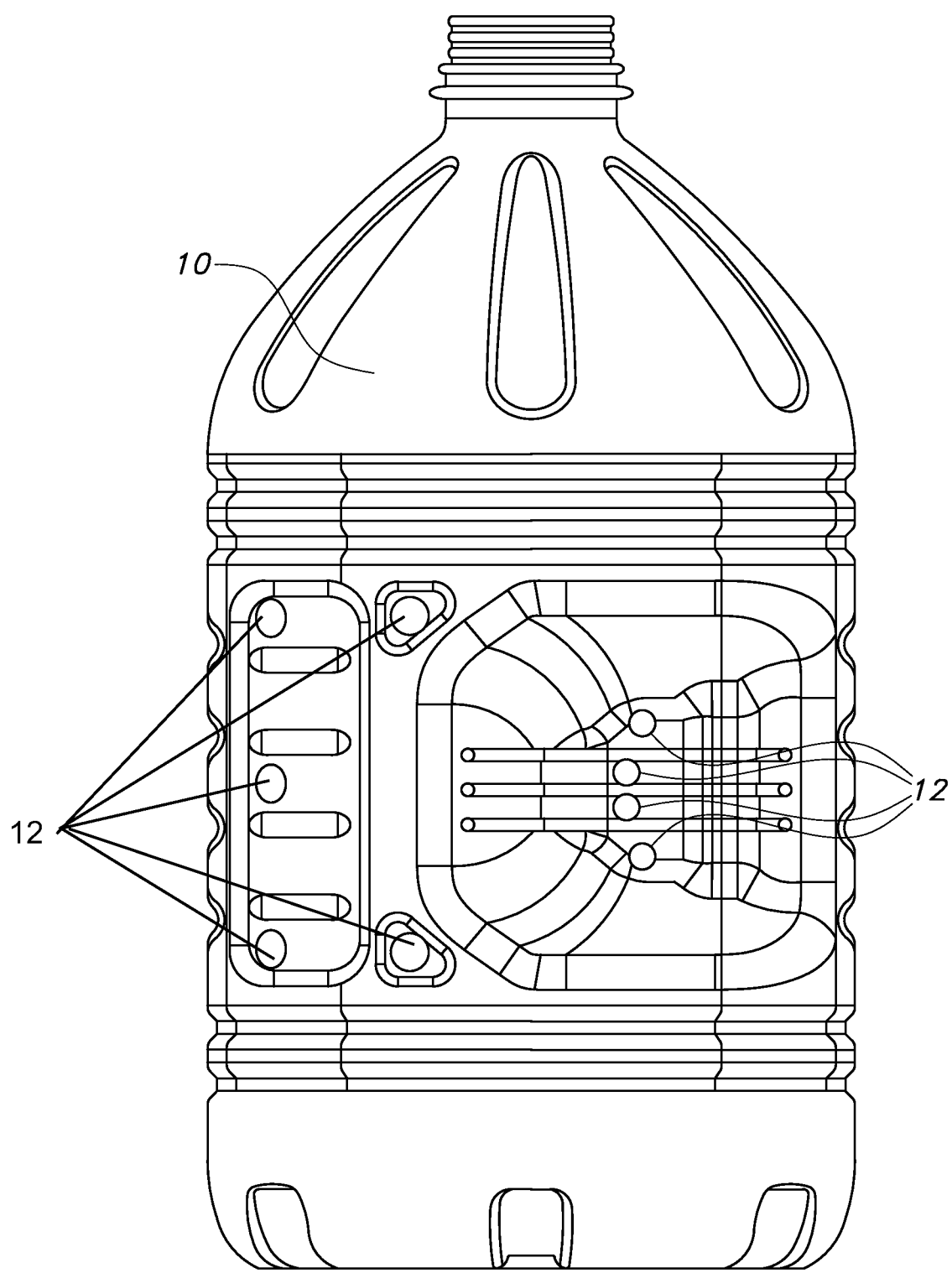
FIG. 4 is a left side view of the filter.
Figure 5:
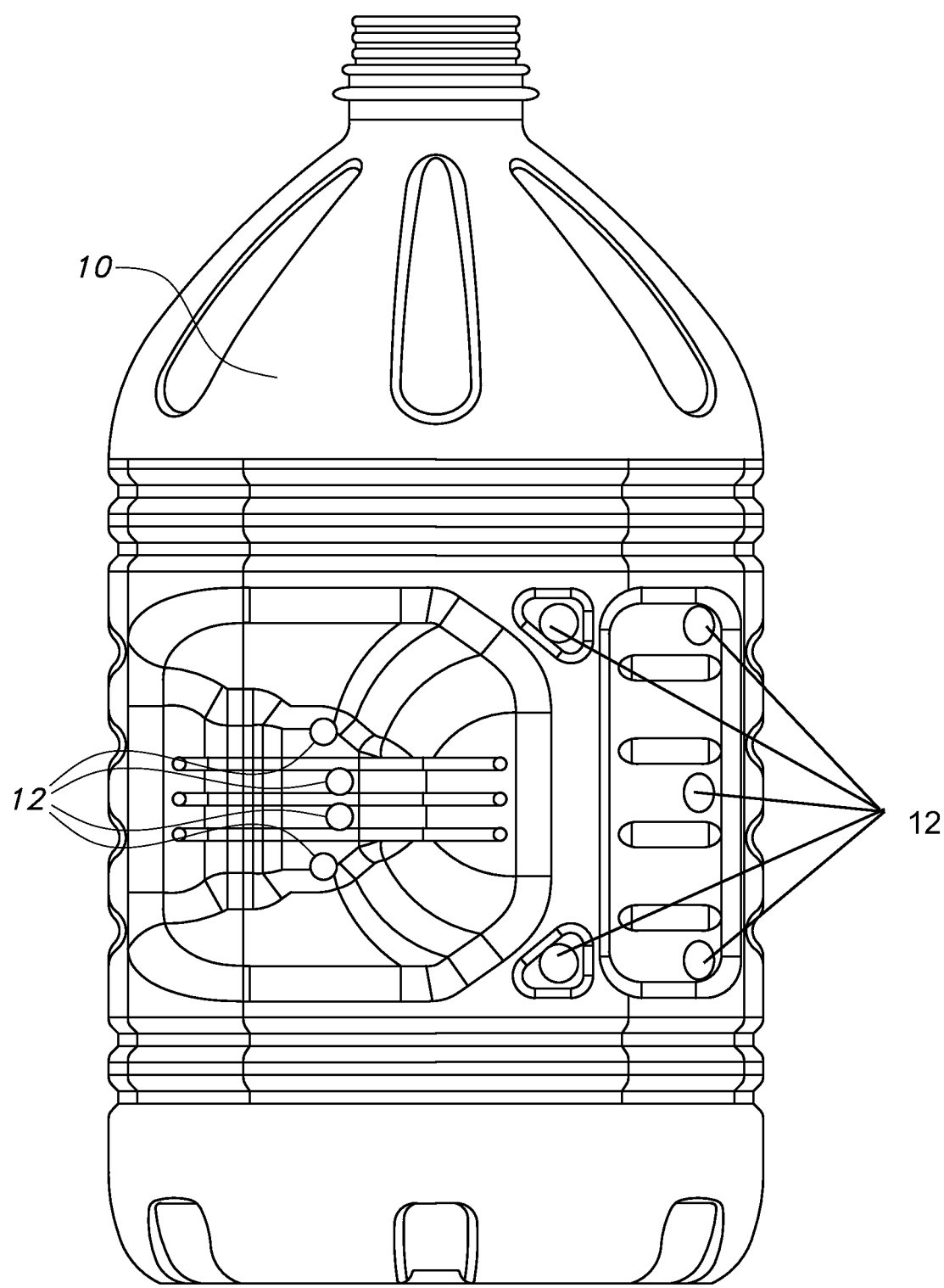
FIG. 5 is a right side view of the filter.
Figure 6:
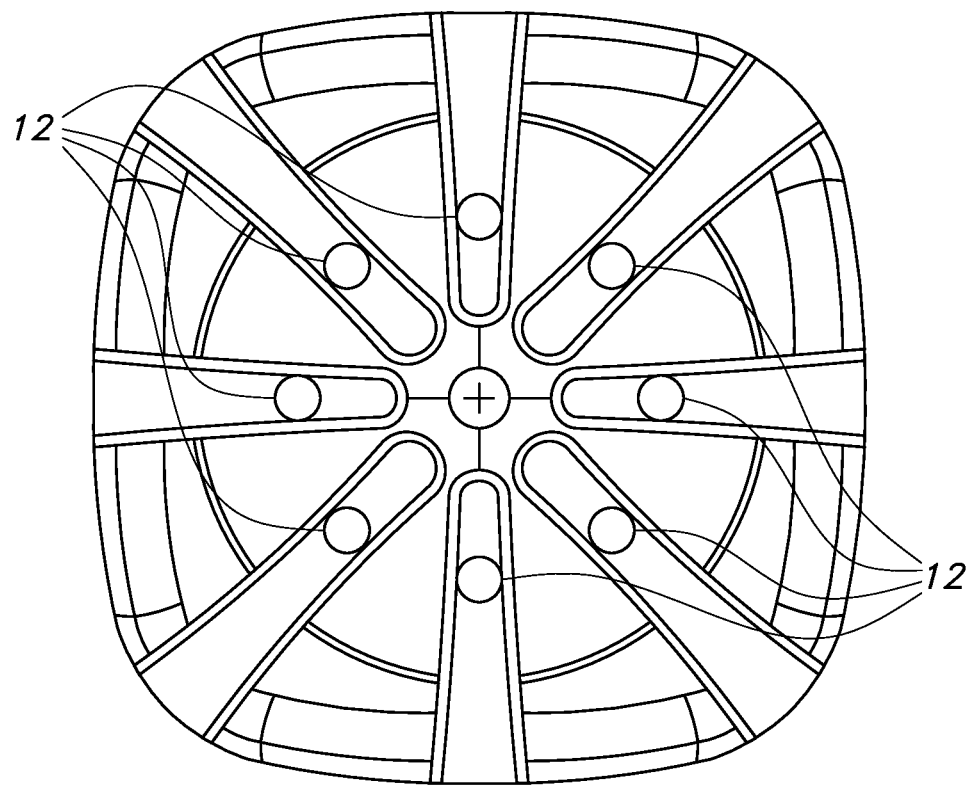
FIG. 6 is a bottom view of the filter.
Figure 7:
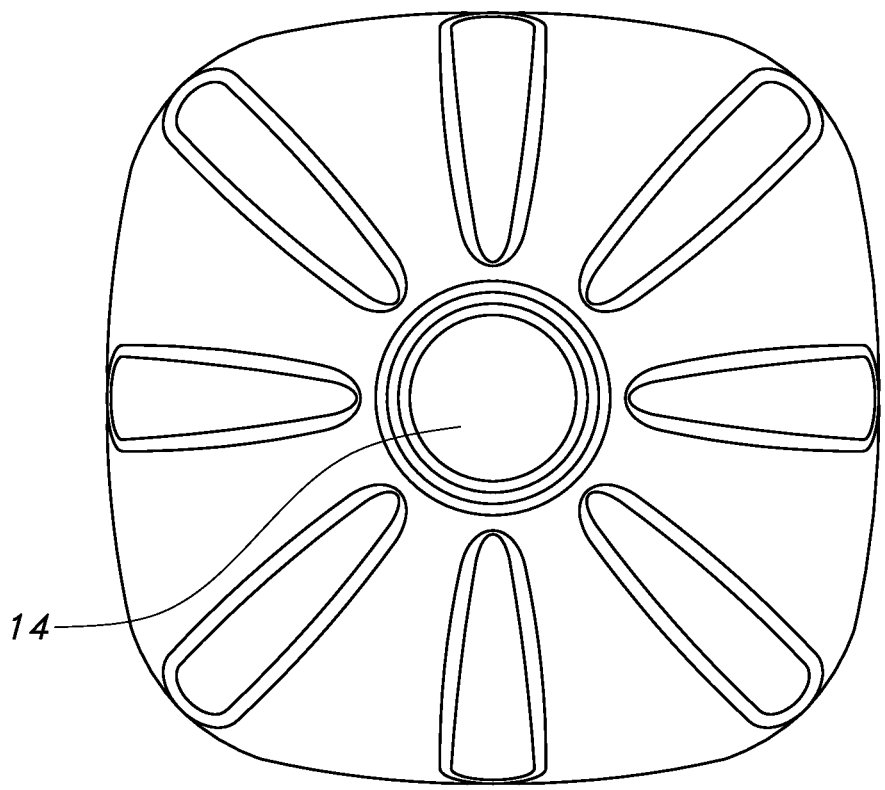
FIG. 7 is a top view of the filter.
Figure 8:
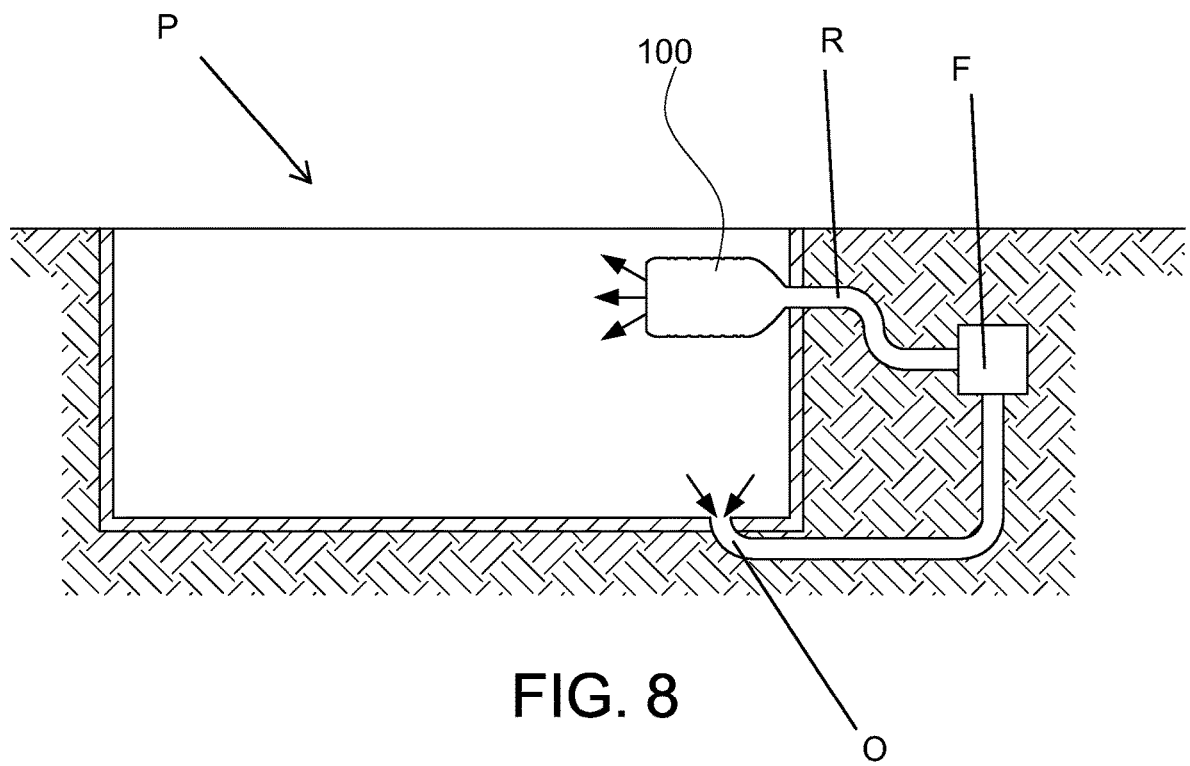
FIG. 8 is a side view of a conventional pool showing the filter in use.

FIGS. 1-7 illustrate the filtering device 100 according to the invention, including a container 10, filter material 30, and a pool attachment member 50. In general, the filter material 30 fills the majority of the container 10 and the pool attachment member 50 secures the container 10 to the pool P. The filter device 100 is generally used with a conventional pool filtration system F and may be used with either above ground pools or in-ground pools. An illustration of the device 100 used in connection with a pool P and filtering system F is shown in FIG. 8.

In general, to work with these conventional filtration systems F the pool includes both an outlet line O an return feed R. The filtration systems F typically include a pump and a filter device and are connected to the return feed and outlet line by hoses so that the pump may pull water out of the pool and through a filtration device after which the water is pumped back into the pool through an return feed. The water reenters the pool it is under pressure from the pump.

The pool attachment member 50 secures the container to the return feed opening, most likely inside the pool P, and the water from the conventional filtration enters the container under pressure as it exits the filtration system F and reenters the pool. As a result, the water passes through the filtration material 30 and exits through outlet openings 12 in the container 10. The configuration of the pool attachment member 50 may vary depending on the type of pool or tubing that the filter is being attached too.

The container 10 has an inlet opening 14 on one end that is sized and shaped to have an approximate fit with the conventional pool return feed, with an outer side 15 of the inlet opening 14 likely being threaded. The outlet openings 12 may vary in number and in placement. For example, one particularly suitable arrangement includes the following openings arranged around the sides of the container 10: two sets of four openings 12 arranged in a row along either side of the container 10; two sets of three openings 12 near the rounded corners of the container 10; and two sets of two openings 12 between the previously mentioned sets. An approximately circular arrangement of 8 openings 12 is included on the bottom of the container 10.

The container 10 may come in a number of shapes and sizes, for example, the container 10 may have an approximately cylindrical shape and measure approximately 12 inches in length and 5 inches in width. The container's inlet 14 may have an outer rim 16 that works in connection with the attachment member to create a secure attachment to the pool or tubing.

The container 10 is likely to be hollow or mostly hollow to allow the filter material 30 to fill the entirety or near entirety of the container for maximum filtration. There are a number of materials that may be use as a suitable filter material, for example, polyester fiberfill. Polyester fiberfill is a particularly advantageous material as it may be stuffed into the container in a manner that substantially fills the container and provides high filtering capabilities.

The pool attachment member 50 may have a different configuration depending on the design of the pool's return feed. In particular, most above ground pools have one standard return feed/outlet while in-ground pools have another. In each case, the inner side of the pool includes a directional nipple that is secured in place by a threaded O-ring which is removed to accommodate most pool attachment members 50.

Figure 9A:
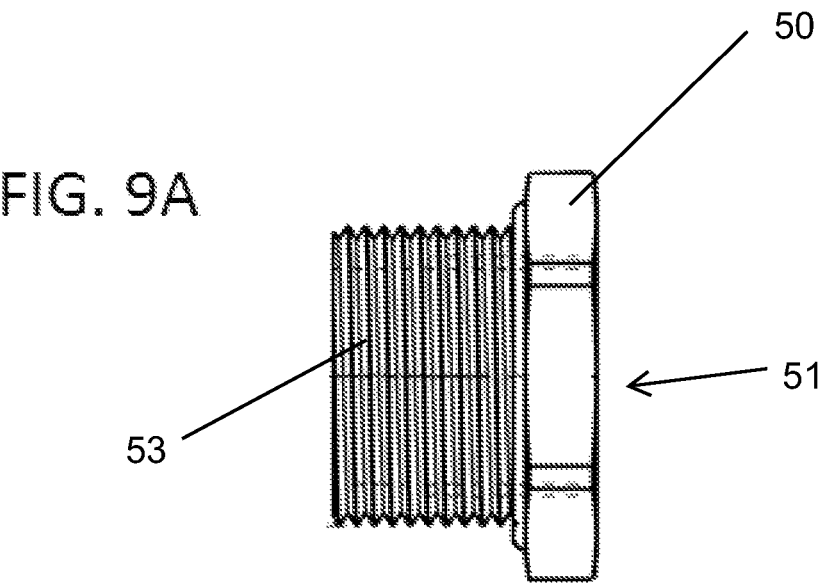
FIG. 9A is a side view of one embodiment of a pool attachment member.
Figure 9B:
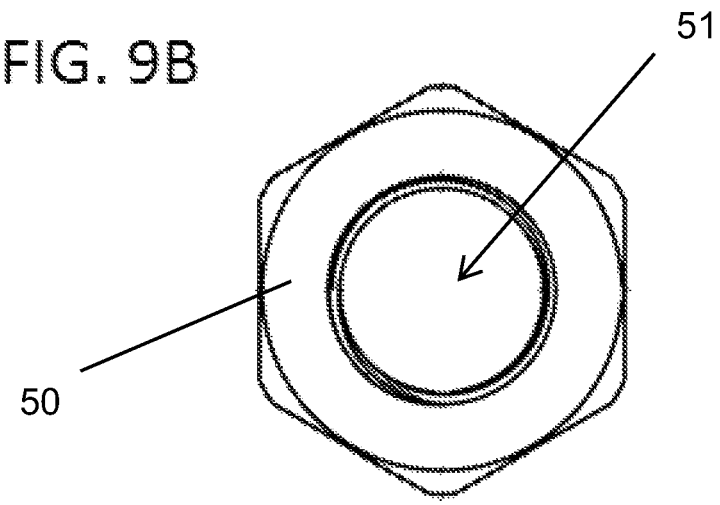
FIG. 9B is a top plan view of the first embodiment of the pool attachment member.

For example, FIGS. 9A and 9B illustrate a pool attachment member 50 that may be used with an in-ground pool. Both the inside 51 and the outside 53 of this attachment member are threaded, such that the pool attachment member may be screwed into the pool's conventional return feed, and then the threaded end 15 of the container 10 opening 14 may be screwed into the attachment member 50.

As a separate example, FIGS. 10A, 10B, 11A, and 11B illustrate a pool attachment member 50 that may be used with quick set pools. FIGS. 10A and 10B illustrate a filtering device connector 52 while FIGS. 11A and 11B illustrate a return feed connector 54. The filtering device connector 52 has a container end 56 that is inserted into the container 10 and a threaded cap 58 that is screwed on to the top of the container 10. A connector end 62 is threaded and sized to fit into the return feed connector 54. The return feed connector has a first end 64 has an exterior that is sized to fit tightly into the return feed and an internal opening 66 that is threaded and sized to accept the connector end 62. Once the filtering device connector 52 is connected to the filtering device 100 and the return feed connector 54 is connected to the return feed the filtering device 100 is submerged under water in the pool P, at which point water flows into the device 100 and air is pushed out causing air bubbles to be visible in the water. Once the bubbles cease being visible the connector end 62 is screwed into the internal opening 66 and the filter device 100 is ready to use.

Figure 12A:
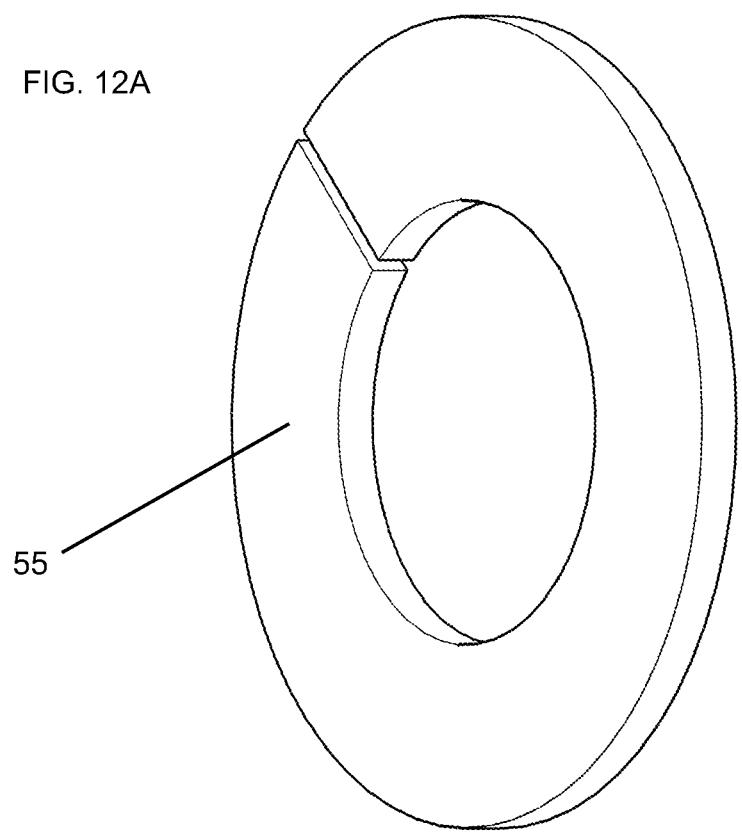
FIG. 12A is a perspective view of a retaining washer.
Figure 12B:
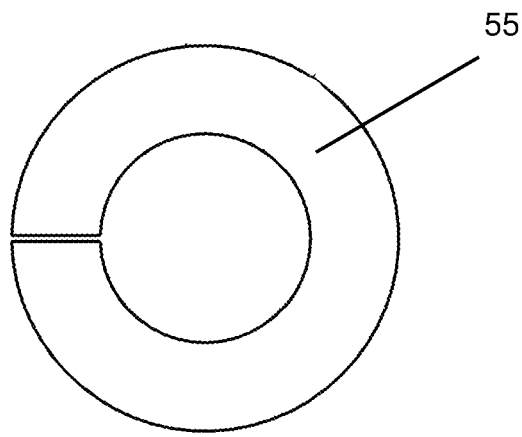
FIG. 12B is a top view of the retaining washer.

With the standard aboveground pool attachment, the pool attachment member 50 requires that the directional nipple be removed and uses a conventional O-ring that is commonly provided with conventional filtering systems. A retaining washer 55, shown in FIGS. 12A and 12B, is provided to the entry end of the container and is inserted into the O-ring. The retaining washer 55 has an opening in the middle that is sized to fit with the end of the container 10, and in particular to snap over and under the outer ring 16, and has an outer surfaced that is sized to fit within the conventional O-ring. When the O-ring is inserted over the outer ring 16 and the retaining washer 55 is placed under the outer ring 16 the O-ring is secured to the container 10. Securing the O-ring against the return feed then creates a water-tight fit between the opening of the container 10 and the side of the pool P, and the filtering device 100 is secured in a manner that allows the filtering device 100 to hold its position as the water passes through and is filtered.

In each configuration, the container 10 is removably affixed to the inside of the pool by the inlet in a manner that secularly couples the container to the pool while the water is returned to the pool and through the filter under pressure and in a relatively water-tight manner that causes the water to pass through the filtering device 100.

As a procedural example, the following steps may be followed to use the filtering device 100 with a conventional in-ground or steel-sided above ground pool:
1. Locate the return feed on the wall of the pool;
2. Unscrew the "O" ring and directional jet from the return feed put both in a safe place as they will need them on when not using the filter device 100;
3. Take the filter device 100 and screw the male end into the threaded opening of the return feed and tighten;
4. Take the filter device 100 and submerge it under the water (bubbles will be created as the air is replaced) until bubbles stop and all the air is out;
5. Keep the filter device 100 submerged and with the cap and male connector attachments secured to the filter screw the male connector into the threaded end of the reducer attached earlier to the return feed until tight;
6. The filter is now ready to operate, turn on the filtration system after which water flows through the pump and out through filtering device 100 and return cleaner water into the pool.

When the pool water is clean the filter device 100 may be removed. It is important when removing the filtering device that it be kept submerged under water until it is possible to quickly remove it from the pool as it will drain immediately upon exposure to air, potentially draining the contaminates back into the pool. The filtering device should be unscrewed from the return feed keeping the filter submerged then quickly removed from the pool to an area on the ground where it can drain out. The majority of the contaminates collected will drain out leaving the inside filter material with a cleaner look and ready to be reused.

The filtering device 100 may also be cleaned by inserting the end of a garden hose into mouth of the container, being careful not to insert the hose too deep into the container, and run clean water through the filter device. When the water runs clean and the inside material is cleaner it is ready to reuse as directed.

It is understood that the embodiments described herein are merely illustrative of the present invention. Variations in the construction of the filtering device may be contemplated by one skilled in the art without limiting the intended scope of the invention herein disclosed and as defined by the following claims.

What is claimed is:

1. A method of filtering swimming pool water being returned to a swimming pool, the method comprising the steps of:
   providing a filtering device including:
   a container having an inlet and at least one outlet opening;
   a filter material disposed within the container interposed between the inlet and the at least one outlet; and
   a pool attachment member capable of fluidically attaching the inlet of the container to a return feed opening of a swimming pool filtration system such that water returning to the swimming pool from the filtration system enters the container under pressure as it exits the return feed opening;

attaching and placing the inlet of the container in pressurized fluid communication with the return feed opening via the pool attachment member; and flowing water through the filter device where the water passes through the filter material and contaminants are removed, and filtered water is returned to the swimming pool through the at least one outlet opening.

2. The method of filtering swimming pool water being returned to a swimming pool of claim 1, wherein the container includes a plurality of outlet openings.

3. The method of filtering swimming pool water being returned to a swimming pool of claim 2, wherein the plurality of outlet openings includes at least one opening in a sidewall of the container.

4. The method of filtering swimming pool water being returned to a swimming pool of claim 2, wherein the plurality of outlet openings includes at least one opening in a bottom wall of the container.

5. The method of filtering swimming pool water being returned to a swimming pool of claim 2, wherein the filtering material is polyester fiberfill.

6. The method of filtering swimming pool water being returned to a swimming pool of claim 3, wherein the filtering material is polyester fiberfill.

7. The method of filtering swimming pool water being returned to a swimming pool of claim 4, wherein the filtering material is polyester fiberfill.

8. The method of filtering swimming pool water being returned to a swimming pool of claim 1, wherein the filtering material is polyester fiberfill.

* * * * *